(12) United States Patent
Brubacher

(10) Patent No.: US 11,832,606 B1
(45) Date of Patent: Dec. 5, 2023

(54) ORGANISM ERADICATION SYSTEM AND METHOD OF USE

(71) Applicant: SoBru Solutions, Inc., Fullerton, CA (US)

(72) Inventor: John Miles Brubacher, La Mirada, CA (US)

(73) Assignee: SCANLOGX, INC., Waco, TX (US)

(*) Notice: Subject to any disclaimer, the term of this patent is extended or adjusted under 35 U.S.C. 154(b) by 272 days.

(21) Appl. No.: 16/796,478

(22) Filed: Feb. 20, 2020

Related U.S. Application Data

(60) Provisional application No. 62/808,196, filed on Feb. 20, 2019.

(51) Int. Cl.
| | | |
|---|---|---|
| *A01M 1/20* | (2006.01) | |
| *A01M 19/00* | (2006.01) | |
| *A01K 69/04* | (2006.01) | |
| *A01K 80/00* | (2006.01) | |
| *A01K 61/13* | (2017.01) | |
| *A01M 1/10* | (2006.01) | |

(52) U.S. Cl.
CPC ............ *A01M 1/2094* (2013.01); *A01M 1/20* (2013.01); *A01M 19/00* (2013.01); *A01K 61/13* (2017.01); *A01K 69/04* (2013.01); *A01K 80/00* (2013.01); *A01M 1/10* (2013.01)

(58) Field of Classification Search
CPC .... A01M 1/2094; A01M 29/10; A01M 99/00; A01M 19/00; A01M 1/20; A01K 61/13; C02F 1/14; C02F 1/30; C02F 1/265

USPC ............... 43/124, 132.1; 210/748.1, 748.11, 210/748.16, 748.2, 749, 753–756, 764; 422/6, 22, 24; 119/268
See application file for complete search history.

(56) References Cited

U.S. PATENT DOCUMENTS

| | | | | |
|---|---|---|---|---|
| 1,451,394 A | * | 4/1923 | Hurst ...................... | E02B 1/006 210/162 |
| 3,722,686 A | * | 3/1973 | Arnett .................... | B01D 29/01 210/242.1 |
| 4,172,767 A | * | 10/1979 | Sear ........................ | C02F 1/047 203/DIG. 1 |
| 4,208,290 A | * | 6/1980 | Wetmore ............... | B01D 35/05 210/170.11 |
| 4,219,387 A | * | 8/1980 | Gruntman ................ | C02F 1/14 210/918 |
| 4,325,788 A | * | 4/1982 | Snyder .................. | F24S 30/452 203/1 |
| 4,336,223 A | * | 6/1982 | Hillman .................. | C02F 1/325 210/103 |

(Continued)

FOREIGN PATENT DOCUMENTS

| | | | | |
|---|---|---|---|---|
| CA | 2511168 A1 | * | 12/2006 | .......... A62C 99/009 |
| EP | 564124 A1 | * | 10/1993 | .............. C02F 1/686 |

(Continued)

*Primary Examiner* — Darren W Ark
(74) *Attorney, Agent, or Firm* — Master Key IP, LLP; Jeromye V. Sartain

(57) ABSTRACT

An organism eradication system and method of use configured for capturing and treating target organisms in a body of water, wherein the target organisms enter the system through a concentrator, are exposed to and mixed with an agent in a mixing section, and then die off over an appropriate dwell time with related environmental catalysts in a holder.

16 Claims, 7 Drawing Sheets

(56) References Cited

U.S. PATENT DOCUMENTS

| | | | | |
|---|---|---|---|---|
| 4,363,703 A * | 12/1982 | ElDifrawi | C02F 1/14 | 202/180 |
| 4,504,362 A * | 3/1985 | Kruse | F24S 30/40 | 202/180 |
| 4,640,044 A * | 2/1987 | Varnon | A01M 1/2094 | 126/714 |
| 4,959,127 A * | 9/1990 | Michna | C02F 1/14 | 159/48.1 |
| 5,099,598 A * | 3/1992 | Carter | A01M 1/2094 | 43/132.1 |
| 5,240,674 A * | 8/1993 | Armor | F16L 55/24 | 210/764 |
| 5,256,310 A * | 10/1993 | Brooks | C02F 1/686 | 210/764 |
| 5,308,505 A * | 5/1994 | Titus | A61L 2/10 | 210/764 |
| 5,343,652 A * | 9/1994 | Johnson | A01M 1/04 | 43/132.1 |
| 5,368,748 A * | 11/1994 | Sanderson | C02F 1/481 | 210/764 |
| 5,476,595 A * | 12/1995 | Baddour | C02F 1/46104 | 210/243 |
| 5,525,222 A * | 6/1996 | Gleason | B01D 29/114 | 210/489 |
| 5,655,483 A * | 8/1997 | Lewis | A01M 19/00 | 210/748.11 |
| 5,893,233 A * | 4/1999 | Kaster | B63B 59/04 | 43/124 |
| 6,036,850 A * | 3/2000 | Reynolds | B01D 29/21 | 210/462 |
| 6,149,343 A * | 11/2000 | Lewis | A01M 21/046 | 210/748.11 |
| 6,500,345 B2 * | 12/2002 | Constantine | B04C 9/00 | 210/764 |
| 6,682,651 B1 * | 1/2004 | Toland | B01D 29/15 | 210/162 |
| 6,821,442 B1 * | 11/2004 | Watten | C02F 1/20 | 210/764 |
| 7,201,842 B2 * | 4/2007 | Kiefer | B01D 29/085 | 210/162 |
| 7,416,643 B2 * | 8/2008 | Yonover | C02F 1/18 | 203/DIG. 1 |
| 7,575,677 B1 * | 8/2009 | Barnes | B01D 29/111 | 210/172.3 |
| 7,695,675 B2 * | 4/2010 | Kaiser | A61M 1/3681 | 422/186 |
| 7,900,780 B2 * | 3/2011 | Ueki | B63J 4/002 | 210/399 |
| 8,479,438 B1 * | 7/2013 | Wilhelmi | A01M 1/2094 | 43/132.1 |
| 8,529,770 B2 * | 9/2013 | Yencho | C02F 1/325 | 422/186 |
| 9,352,981 B2 * | 5/2016 | Simpson | B01D 5/006 | |
| 9,644,229 B2 * | 5/2017 | Brubacher | C12Q 1/04 | |
| 10,345,199 B2 * | 7/2019 | Brubacher | G01N 1/2035 | |
| 11,134,669 B2 * | 10/2021 | Yanagawa | E02B 1/006 | |
| 11,140,893 B2 * | 10/2021 | Yanagawa | C02F 1/30 | |
| 11,254,395 B2 * | 2/2022 | Hartman | B63B 34/70 | |
| 11,297,809 B1 * | 4/2022 | Gilmore | A01K 61/13 | |
| 2002/0005385 A1 * | 1/2002 | Stevens, Sr. | B01D 61/025 | 210/748.11 |
| 2003/0147770 A1 * | 8/2003 | Brown | A61L 2/0011 | 422/38 |
| 2003/0150704 A1 * | 8/2003 | Posada | F24S 23/30 | 203/1 |
| 2005/0016906 A1 * | 1/2005 | Gettman | B01D 61/08 | 210/182 |
| 2006/0081455 A1 * | 4/2006 | Yonover | C02F 1/14 | 202/152 |
| 2008/0023407 A1 * | 1/2008 | Eriksson | C02F 1/24 | 210/753 |
| 2010/0037651 A1 * | 2/2010 | Corl | B01D 5/0039 | 62/513 |
| 2012/0061329 A1 * | 3/2012 | Wu | B01J 19/10 | 210/748.03 |
| 2012/0115723 A1 * | 5/2012 | Stimson | A01N 33/12 | 210/764 |
| 2012/0279927 A1 * | 11/2012 | Husson, Jr. | B32B 37/144 | 210/175 |
| 2014/0360859 A1 * | 12/2014 | Faidi | B01D 1/0035 | 203/10 |
| 2015/0167045 A1 * | 6/2015 | Brubacher | C12Q 1/04 | 435/288.7 |
| 2015/0211043 A1 * | 7/2015 | Ram | C12Q 1/04 | 435/288.7 |
| 2015/0337350 A1 * | 11/2015 | Ram | C12Q 1/04 | 435/288.1 |
| 2016/0313230 A1 * | 10/2016 | Brubacher | G01N 15/1459 | |
| 2016/0334308 A1 * | 11/2016 | Brubacher | G01N 1/2035 | |
| 2017/0158525 A1 * | 6/2017 | Calene | C02F 1/001 | |
| 2017/0241892 A1 * | 8/2017 | Brubacher | G06T 7/0012 | |
| 2017/0295783 A1 * | 10/2017 | Li | A01N 65/44 | |
| 2018/0111092 A1 * | 4/2018 | Shudo | C02F 1/448 | |
| 2018/0255761 A1 * | 9/2018 | Paoluccio | A01M 1/226 | |
| 2019/0021302 A1 * | 1/2019 | Zolper | A01M 7/005 | |
| 2019/0367388 A1 * | 12/2019 | Baker | C02F 1/66 | |
| 2021/0060558 A1 * | 3/2021 | Brubacher | G06T 7/0012 | |
| 2021/0220775 A1 * | 7/2021 | Tayebi | B01D 61/08 | |
| 2021/0238057 A1 * | 8/2021 | Hobson | F24S 20/30 | |
| 2021/0274767 A1 * | 9/2021 | Bell | A01M 1/2094 | |
| 2021/0380437 A1 * | 12/2021 | Rosti | B01D 1/0035 | |
| 2022/0151220 A1 * | 5/2022 | DiLorenzo | H04R 1/20 | |
| 2022/0153394 A1 * | 5/2022 | DiLorenzo | B63B 59/04 | |
| 2022/0161194 A1 * | 5/2022 | Warsinger | B01D 71/52 | |

FOREIGN PATENT DOCUMENTS

| | | | | |
|---|---|---|---|---|
| WO | WO-9703926 A2 * | 2/1997 | | A61L 2/16 |
| WO | WO-02072478 A2 * | 9/2002 | | C02F 1/70 |
| WO | WO-2017074476 A1 * | 5/2017 | | B01D 1/0082 |
| WO | WO-2019148022 A1 * | 8/2019 | | A01M 1/023 |
| WO | WO-2020197638 A1 * | 10/2020 | | |
| WO | WO-2022011016 A1 * | 1/2022 | | B01D 1/0082 |

* cited by examiner

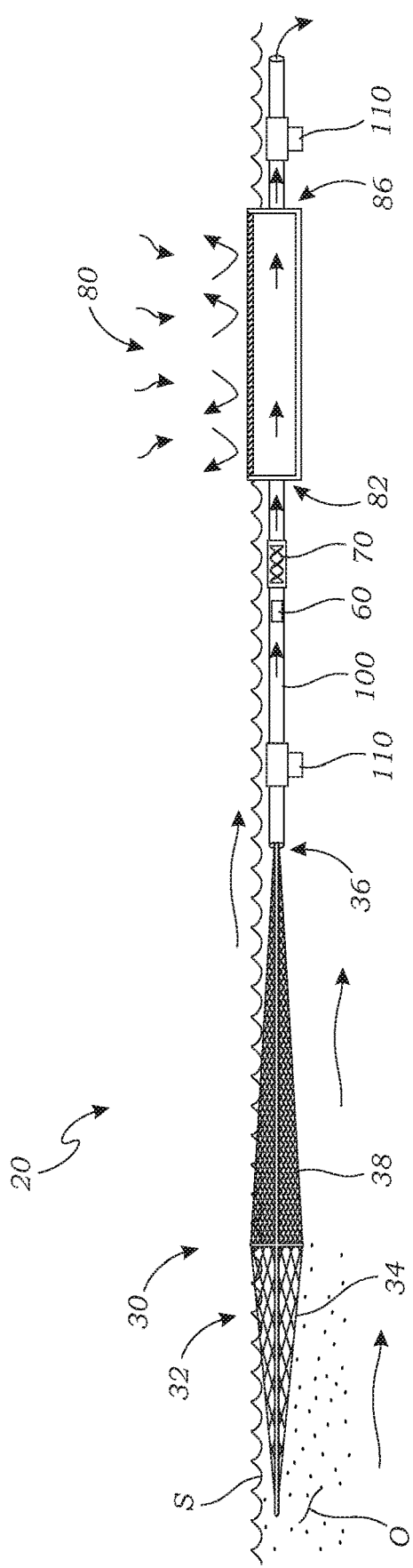
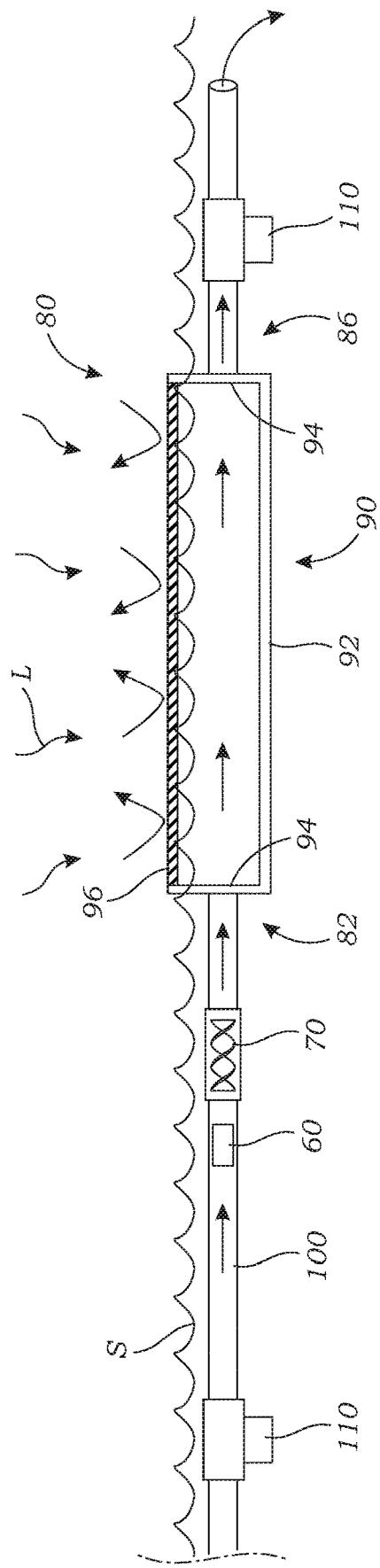
Fig. 9
Fig. 10

ORGANISM ERADICATION SYSTEM AND METHOD OF USE

RELATED APPLICATIONS

This non-provisional patent application claims priority pursuant to 35 U.S.C. § 119(e) to and is entitled to the filing date of U.S. Provisional Patent Application Ser. No. 62/808,196, filed Feb. 20, 2019, and entitled "Organism Eradication System and Method of Use." The contents of the aforementioned application are incorporated herein by reference.

BACKGROUND

The subject of this patent application relates generally to organism treatment, and more particularly to an organism eradication system and method configured for addressing invasive and nuisance species and the like.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, the spread of invasive species in and throughout U.S. water systems has become a nationwide problem. Invasive species are generally defined as any plant, fungus, or animal species that is not native to a specific location (an introduced species), and which has a tendency to spread to a degree believed to cause damage to the environment, the economy, and/or human health. When it comes to waterborne invasives, *Dreissenids* or *Dreissenidae* freshwater mussels are a particular threat at this time, such as *Quagga* and Zebra mussels, which propagate rapidly and can wreak havoc on ecosystems and infrastructure. Some have estimated that the combined total of all invasive species are a net $120 Billion per year problem in the U.S. alone, and recent studies show it is only getting worse, with inadequate technology to rapidly detect and effectively target these pesky mussels so as to beat them back.

Accordingly, addressing invasive species such as Dreissenidae freshwater mussels has become a top priority from the U.S. federal government to state and local efforts, both public and private. In a Jun. 22, 2017 letter from the Western Governors' Association to then Secretary of the Interior Ryan Zinke, it was stated that the " . . . Governors identify the rapid spread of invasive species as one of the nation's biggest environmental problems." Basically, what started likely due to ballast exchanges in the Great Lakes is now spreading through river and lake systems westward, with perhaps only the Columbia River Basin in the Pacific Northwest not yet compromised. In a February 2018 Progress Report published by the U.S. Department of the Interior entitled "Safeguarding the West from Invasive Species" it was noted that "[i]nvasive species are among the top threats facing the lands and waters of the Nation" and that such invasives "significantly threaten America's waters, causing substantial impacts to water infrastructure and aquatic ecosystems and threatening power generation, water supply, fisheries, and recreation." States from California to Texas to Montana and Minnesota are sounding the alarm.

While the focus of much inter-disciplinary research and study has been in the area of detection and treatment of adult stage invasive mussels and related prevention of transfer and colonization of such mussels through programs ranging from boat hull inspections and rinses to a variety of molluscicide developments, what is lacking is more effective real-time detection and targeted or surgical treatment of such mussels, particularly at the larval or veliger stage of early development, before they can mature to adulthood and form colonies and continue to propagate. Indeed, according to a USGS presentation dated Sep. 12, 2018, given by James A. Luoma and entitled "Managing zebra mussels: Developing treatments to eradicate localized populations and evaluating low-dose copper treatments," it was concluded, in part, that "[t]he potential to manage zebra mussel populations and to curtail their ecosystem and economic impacts through the use of larval suppression techniques warrants further investigation," it being appreciated that veligers may also be relatively easier to kill than adult mussels. The present application is addressed to just such an objective of larval or veliger suppression or eradication. It will be appreciated that such suppression or eradication techniques can be applied, and scaled up or down as appropriate, to address other invasive species, such as the spiny water flea (*Bythotrephes longimanus*) that is native to Europe and Asia and is a predator to zooplankton and so has thrown off delicate food chain and ecosystem balances in freshwater systems throughout North America.

Similar environmental challenges relate to delicate balances of life forms and species often necessitated within ecosystems, where even native organisms if left unchecked due to lack or imbalance in natural predators, for example, can become a nuisance and harmful to the overall ecosystem and would need to be addressed through localized eradication and/or suppression techniques as through active or lethal agents or other treatment schemes targeting the nuisance species. Currently, for example, in locales such as the North Atlantic Ocean (e.g., Chesapeake Bay) and in a variety of seas and inlets around the world (salt, fresh, and brackish water bodies), phytoplankton blooms triggered by an overabundance of nutrients from sources such as sewage discharge or runoff of agricultural fertilizers used on land can be catastrophic to the ecosystem and other marine life, such blooms blocking sunlight and adversely affecting submerged aquatic vegetation and thus the food chain and overall ecosystem as well as in some cases even dying blooms adversely affecting dissolved oxygen levels in the water and so being responsible for many massive fish kills over the years. As such, eradication or suppression even of native aquatic species in some circumstances may be called for with proper mitigation or parameters.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing an organism eradication system and method of use configured for capturing and treating target organisms in a body of water. In at least one embodiment, the system and method entails the target organisms such as mussel veligers entering the system through a concentrator, being exposed to and mixed with a treatment dosage such as a molluscicide in a mixing section, including an injector and a mixer, and then dying off over an appropriate dwell time with related environmental catalysts in a holder or "kill tunnel."

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 9 is a schematic rendering of a fifth exemplary organism eradication system, in accordance with at least one embodiment; and FIG. 10 is a side schematic rendering of an alternative exemplary holder thereof, in accordance with at least one embodiment.

Figure 1:
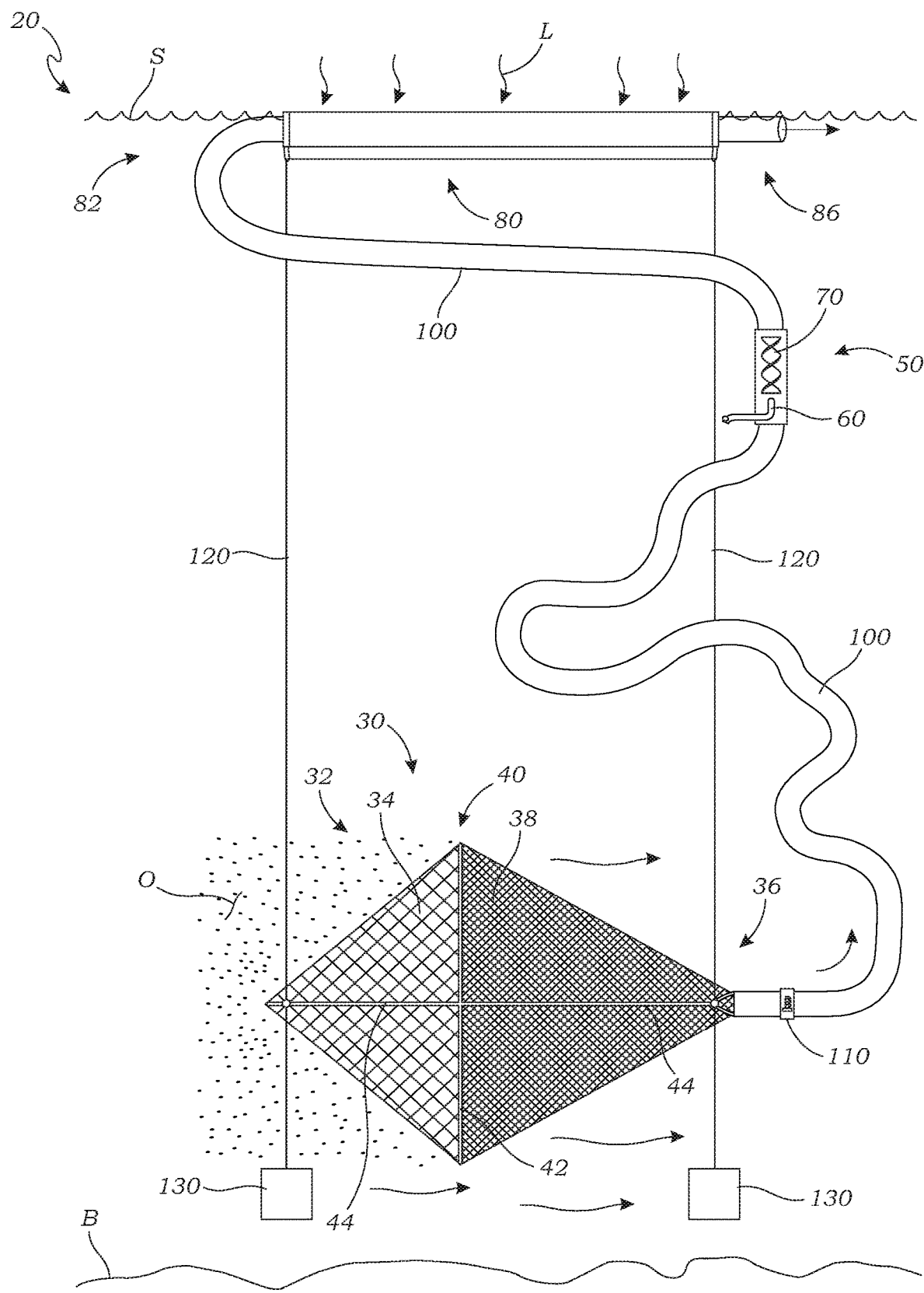
FIG. 1 is a schematic rendering of an exemplary organism eradication system, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of a system or apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of any appended claims.

As a threshold matter, while the context of the present organism eradication system and method of use is Dreissenidae freshwater mussels, and particularly the larval or veliger stage thereof, it will be appreciated that the invention is not so limited but may instead be employed in connection with a variety of invasive or non-invasive species at a variety of life stages and so may be modified or scaled up or down accordingly without departing from the spirit and scope of aspects of the present invention.

By way of further background and illustration but not limitation, it is known that mussels release their future generation, larvae or veligers, in "swarms" throughout their active periods each season and that there can be millions of these microscopic veligers (larvae) in these swarms. In this context or life stage, the veligers are essentially passive, with their location primarily based on local hydrological characteristics. At a high level, through detection technology, hydrology studies, educated guesses, and/or related assumptions about the presence of such organisms at particular locations such as dam intakes based on the time of year, local hydrology, and other available information, treatment or other suppression techniques for the complete or at least partial eradication of target organisms such as mussel veligers can be implemented.

Turning now to FIG. 1, there is shown a schematic rendering of an exemplary embodiment of an organism eradication system 20 according to aspects of the present invention. The system 20 comprises, in the exemplary embodiment, essentially from overall inlet to outlet, a concentrator 30, a mixing section 50 comprising an injector 60 and a mixer 70, and a holder 80 or "kill tunnel," which are discussed in turn below. A variety of other tubes or pipework, pumps, fittings, etc., whether now known or later developed, may also be employed in the system 20. Generally speaking, the system 20 is located in a body of water of interest where target organisms O are known to exist, it thus being appreciated that a system 20 according to aspects of the present invention is a scalable in situ implementation for direct capture and treatment of target organisms O "on location." Relatedly, the inventor has also conceived and filed and been awarded patents on other technologies that may assist in or contribute to the real time or near real time determination of the presence of organisms O in a body of water, including the number and type of organisms and thus their location and relative abundance or concentration, including but not limited to U.S. Pat. Nos. 9,644,229, 10,345,199, 10,379,011, and 10,481,075 as well as pending U.S. patent application Ser. No. 15/589,977 filed May 8, 2017 and published as U.S. Patent Application Pub. No. US2017/0241892 on Aug. 24, 2017, all such patent filings being incorporated herein by reference, it being appreciated by those skilled in the art that such technologies or techniques may be employed, in whole or in part or in any combination or at any scale, in connection with an organism eradication system 20 according to aspects of the present invention in making such threshold determinations as when and where to position the system 20 for capture and treatment of organisms O of interest. Back to the exemplary system 20 as illustrated in FIG. 1, the target organisms O such as mussel veligers enter the system through the concentrator 30, are exposed to and mixed with a treatment dosage such as a molluscicide in the mixing section 50, and then die off over an appropriate dwell time with related environmental catalysts in the holder 80 here in the form of or dubbed the "veliger kill tunnel." Once again, those skilled in the art will appreciate that all such components and the overall system may be modified in a variety of ways, such as by changing, supplementing, substituting, adding, or removing any such components or sub-systems, such that the exemplary system is to be understood as merely illustrative of features and aspects of the present invention and expressly non-limiting. As one aspect or "takeaway" regarding an organism eradication system 20 according to aspects of the present invention, the "kill tunnel" or holder 80 wherein the treated organisms O dwell for a period of time, and whether at or near the surface or submerged, can be described or characterized as providing localized environmental stress to increase the lethality of any molluscicide or other agent employed, thereby potentially reducing the dosage for the same effect and potentially reducing or eliminating unwanted environmental impact or collateral damage.

Figure 2:
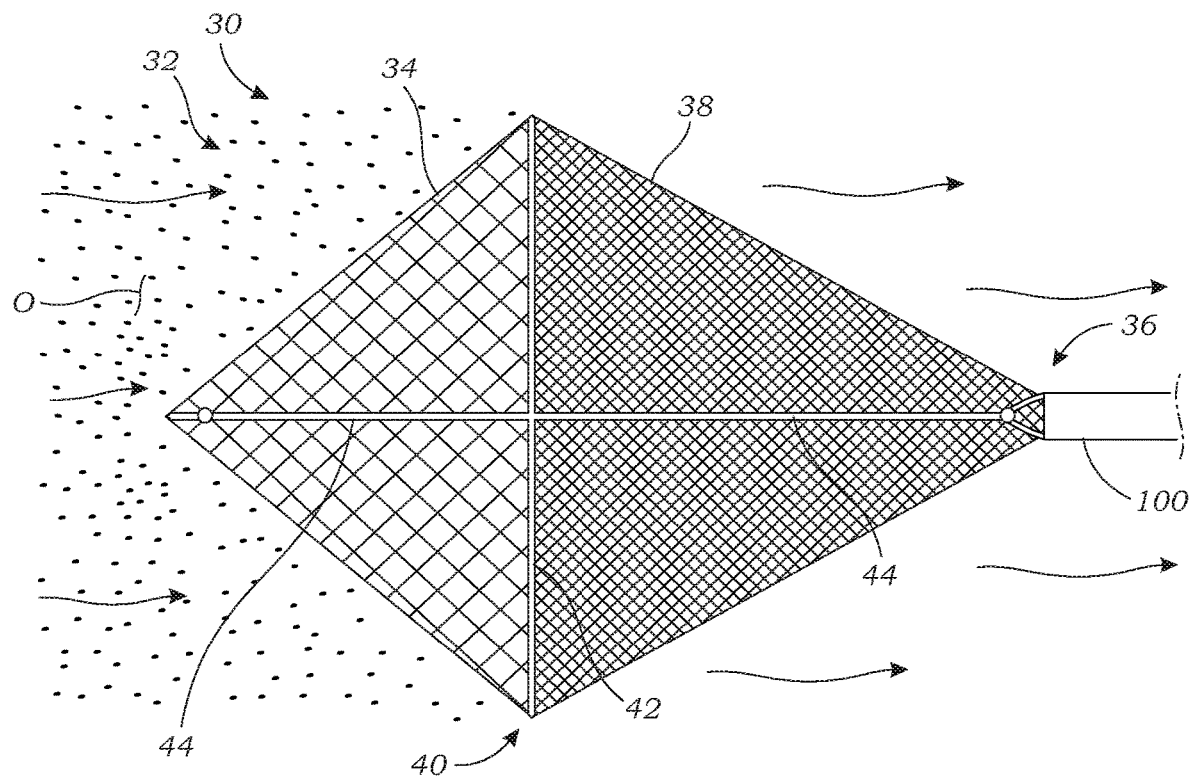
FIG. 2 is a schematic rendering of an exemplary concentrator thereof, in accordance with at least one embodiment.

With continued reference to FIG. 1 depicting an exemplary overall organism eradication system 20 according to aspects of the present invention as well as now FIG. 2 depicting an exemplary concentrator 30, the target organisms O such as a seasonal veliger swarm would enter the concentrator 30 at its inlet 32 or the end that is positioned facing "upstream." As an aside, it is noted that while a "lake" is the indicated body of water, such can instead be a river or stream, coastal areas or waters, including bays and even open water or ocean contexts, or other such water body or source of interest, and even in the context of a lake, whether having an inlet or outlet or not, as through a dam or the like, it will be appreciated that there typically are still flows or hydrology effects to some extent due to a variety of factors, with the inlet side 32 of the concentrator 30, again, generally oriented into such flow. The concentrator 30 may be configured as or employing a plankton net or the like, which is designed and configured to pass through particulate that is smaller than the target organisms O such as veligers and block particles or organisms that are larger. In the exemplary embodiment, a nominal five meter (5 m) diameter ring or sized net may be employed, such concentrator 30 being constructed with or comprising a framework 40 having a somewhat central ring 42 and somewhat lengthwise spokes 44 extending from the ring 42 in either direction toward the concentrator's inlet 32 and outlet 36 so as to support the blocking net 34 and the pass-through net 38 in an "open" configuration, as described further below. In terms of the overall length of the concentrator 30, or of its front and back sections, and thus the angles of the blocking net 34 and the pass-through net 38 into the flow, or relative to the direction of the flow or somewhat perpendicularly the plane of the central ring 42, it will be appreciated that a wide range of geometries are possible and may be employed to suit a particular application, including whether the concentrator 30 is submerged or at or near the water surface S, as will be further appreciated with reference to the alternative exemplary embodiments of an organism eradiation system 20 according to aspects of the present invention as shown in FIGS. 6-10. By way of illustration and not limitation, the size or configuration of the concentrator 30 may be expressed as a length-to-diameter ratio of the blocking net 34 and/or the pass-through net 38 of on the order of 4:1, though ranging from approximately 2:1 to 8:1 or more, which again is effectively dictated by the concentrator framework 40 or any such support structure for the blocking net 34 and the pass-through net 38, the "diameter" essentially being the major diameter of the ring 42, whether or not annular. In the exemplary veliger context, the inlet 32 or upstream end of the concentrator 30 has or is defined by a blocking net 34 being nominally four hundred micron (400 μm) mesh and its outlet 36 or downstream end has or is fed by a pass-through net 38 being nominally sixty-four micron (64 μm) mesh terminating or funneling down to a size or diameter of, for example, a nominal five centimeter (5 cm) diameter, such that it will be appreciated that the concentrator 30 will block any organisms or particles that are greater than 400 μm in this example and allow any organisms or particles that are smaller than 64 μm to pass through the concentrator 30. It is noted that sixty-four micron (64 μm) mesh happens to currently be a common size available for plankton nylon net mesh, though again this and all such dimensions and specifications may be varied to suit particular applications. As such, the exemplary concentrator would capture or "trap" organisms and other particles that are between 64 μm and 400 μm, while effectively bypassing anything outside of that range, "concentrating" the sample by a ratio of on the order of 10,000:1. Thus, geometrically the concentrator 30 serves as an organism or particle sorter, here sized to encompass the typical sizes of mussel larvae or veligers ranging from about 80 to 350 μm. This characteristic can be used to deploy a device that concentrates the veliger swarm while allowing 99.99% or more of the water to flow through it, on which basis it might also be described as a "band pass" system or filter. In terms of the "concentrator" nature of the device, it will again be appreciated that such is a function of the size of the inlet 32 and the outlet 36, or the respective concentrator 30 diameters in this case, though the concentrator 30 can take other forms or geometries/profiles such as square, rectangular, oval, etc. and again may be scaled or sized as appropriate, even to fifteen or twenty or more meters in overall dimension. Accordingly, it is contemplated that the concentrator 30 may ultimately concentrate the sample of interest to on the order of 10,000:1 to 100,000:1 or more. Those skilled in the art will appreciate that such concentration effect coupled with 99.99% or more of the water bypassing the system 20 leads to significant improvement in the lethality and manageability of the system 20. Once more, it is to be understood that all such sizes, shapes, and configurations of the concentrator 30 are merely illustrative of features and aspects of the present invention and non-limiting. By way of further illustration and not limitation, where the target organism O is significantly larger, such as spiny water fleas that can reach up to approximately fifteen millimeters (15 mm) in size, the blocking net 34 as the inlet 32 of the concentrator 30 may be fifteen millimeter (15 mm) mesh while the pass-through net 38 at the outlet 36 of the concentrator 30 may be half millimeter (0.5 mm) mesh, such that the concentrator 30 is here sized to encompass the typical sizes of spiny water fleas ranging from about 0.5 to 15 mm. Once again, a variety of sizes and shapes and overall configurations of any such concentrator 30 may be employed within an organism eradication system 20 according to aspects of the present invention without departing from its spirit and scope.

Figure 3:
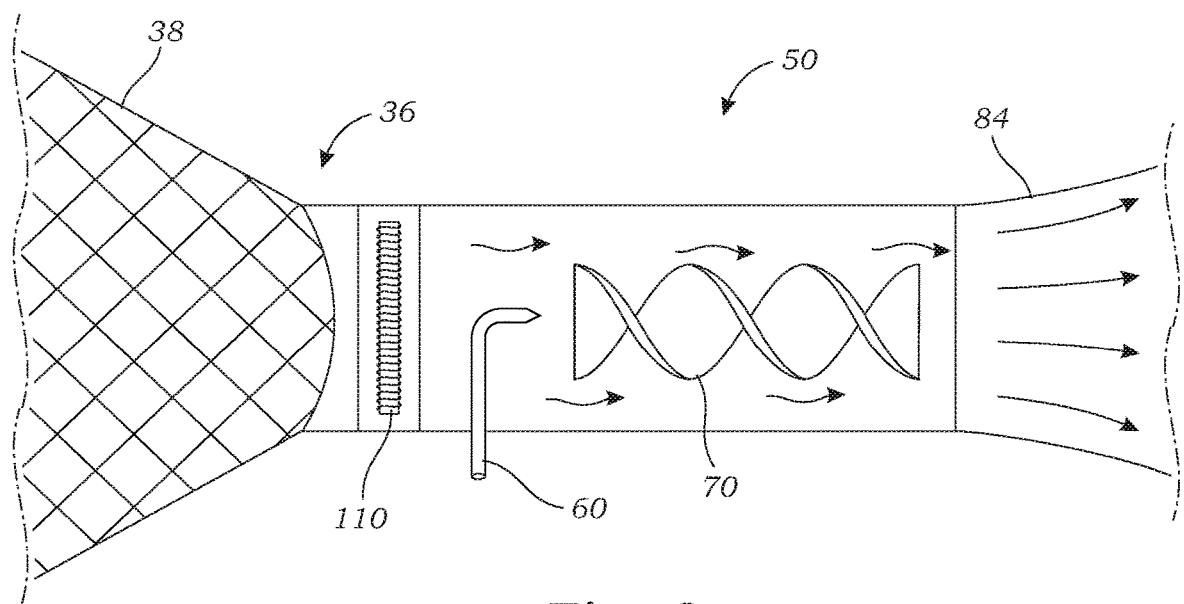
FIG. 3 is a schematic rendering of an exemplary mixing section thereof, in accordance with at least one embodiment.

Referring next to FIG. 1 depicting the overall organism eradication system 20 according to aspects of the present invention now in conjunction with FIG. 3 depicting an exemplary mixing section 50, it is first observed as a threshold matter that while the mixing section 50 is shown in FIG. 1 as being at an intermediate location along the connector tube 100 somewhere between the concentrator 30 at a depth within the body of water and the holder 80 or "kill tunnel" at a surface S thereof and thus oriented somewhat vertically, it may also be oriented somewhat horizontally and/or located in relatively close proximity to the exit end or outlet 36 of the concentrator 30 as shown in FIG. 3, or again really most anywhere between the concentrator 30 and the holder 80 or "kill tunnel," or specifically the expansion chute 84 feeding the kill tunnel 80, more about which is said below, though here shown schematically as having the inlet or expansion chute 84 feeding the kill tunnel 80 immediately following the mixing section 50, which is itself immediately following the exit 36 from the concentrator 30, it will be appreciated that such, as with all schematic drawings herein, is not to be taken literally or to scale and that any length or amount of connector tubing 100 or other components may be employed intermediate the concentrator 30 and the holder 80. In the exemplary embodiment shown in FIG. 3, the mixing section 50 is essentially adjacent to and in fluid communication with the exit or narrow or necked down end or outlet 36 of the downstream pass-through net 38 of the concentrator 30, where it will be appreciated the concentrated sample of water and organisms within the size range of the concentrator capture (here, again, 64-400 μm in the exemplary veliger context) would be leaving the concentrator 30. Whether immediately thereafter or some time later or downstream in the system 20, the concentrated sample would thus enter the mixing section 50. To facilitate such fluid movement and particularly and ultimately to supply such fluid sample to the holder 80 or "kill tunnel" some distance above the concentrator 30 at the surface S in the exemplary embodiment, a pump 110 is provided as is known in the art. The pump 110 may be a part of the mixing section 50 or independent of it. Either way, the pump 50 forces the concentrated sample through the mixing section 50 and then on to the rest of the plumbing and "kill tunnel" section. In a bit more detail, the pump 110 controls the fluid velocity throughout the "closed" system 20, with the velocity through the mixing section 50 potentially being nominally held around the ambient flow rate but can also be above and below that ambient velocity as necessary. The pump power requirement is a function of the flow rate and the depth of the mixing section 50 and/or the pump 110 itself below the surface S, and the velocity can be maintained or adjusted as needed employing related controls and feedback loops as are now known or later developed in the art. The cross-sectional area of the mixing section 50 may be roughly 1/10,000th or less of the area at the inlet 32 to the concentrator 30, as defined by the major diameter or profile of the ring 42, or may have a diameter or profile substantially conforming to that of the outlet 36 from the concentrator 30 as indicated previously; even so, it will be appreciated that the concentrated fluid sample will tend to accelerate and mix as it exits the concentrator 30 and/or enters the mixing section 50. Fundamentally, a molluscicide or other agent is to be injected within the mixing section 50 as through an injector 60, which will mix with the concentrated sample therein and continue to do so up until the time the treated concentrated sample enters the holder 80 or "kill tunnel." Such molluscicide can be introduced or injected into or within the mixing section 50 using any appropriate hardware and related controls or software now known or later developed. The molluscicide injector 60 may be manually controlled or set or may operate variably and automatically to adjust the amount of molluscicide injected relative to the sensed or detected organism concentration level in the sample. Such a sensor (not shown) may be provided virtually anywhere within the system 20, including but not limited to in the mixing section 50 itself or at the outlet 36 from the concentrator 30, though it will be appreciated that having the sensor "upstream" of the injector 60 to some degree would enable the sensor to capture veliger "swarm" or concentration levels approaching the mixing section 50 and also account for possible control system latencies. To further aid in the mixing of the molluscicide or other agent with the concentrated sample, an optional mixer 70 in the form of a turbulator, augur, or other such device now known or later developed may also be provided within the mixing section 50 downstream of the molluscicide injector 60 to enhance homogenous mixing of the treatment solution. Such molluscicide or other agent may include but is not limited to products currently on the market sold under the brand names EarthTec™ and Zequanox™ and even carbon dioxide, again in the context of mussel veligers though not necessarily so, with any other such agent(s) now known or later developed potentially employed, alone or in any combination and in any appropriate amount or concentration, according to aspects of the present invention as appropriate for a particular application or context, such that exemplary molluscicides and related veliger context are to be understood as illustrative and non-limiting. Ultimately, the mixing section 50 directly or indirectly pumps the concentrate through the system 20, injects one or more molluscicide or other such agent, and/or creates or causes turbulence so as to increase the mixing of the kill agent into the concentrated sample within the system 20. By way of further illustration and not limitation, the mixing section 50 may be on the order of five centimeters (5 cm) in diameter and one meter (1 m) long and may have a nominal fluid flow rate therethrough of on the order of a half meter per second (0.5 m/s). Though not shown, it will be appreciated that cabling or the like may be run to the mixing section 50 and any pump 110 employed in the system 20 for power and control requirements in a manner known in the art, whether or not along or even embedded or incorporated in the connector tube 100.

With further reference to FIG. 1, once more, a connector pipe or tube 100 is provided in the exemplary organism eradication system 20 according to aspects of the present invention essentially in order to fluidly connect the concentrator 30 and mixing section 50 with the holder 80 or "kill tunnel," and again, specifically, any inlet 82 or expansion chute 84 at the entrance to the kill tunnel 80. In some contexts, staying with the exemplary veliger application, a larger percentage of the veliger swarms might be closer to the bottom B of the lake or other body of water and therefore a relatively lengthy connection pipe 100 may be required to provide conveyance of the concentrated sample up to the expansion chute 84 and holder 80 or "kill tunnel" at or near the surface S of the water. As the flow of concentrated and treated sample approaches the kill tunnel 80, in order to support adequate dwell time therein to effectively kill the veligers or other target organisms, the fluid velocity must be slowed down to substantially below ambient conditions and/or the conditions found in the mixing section 50. The velocity in the kill tunnel 80 is expected to be in the range of a half millimeter per second to ten millimeters per second (0.5-10 mm/s) in order to accommodate adequate dwell time to effectively exterminate the veligers or other target organisms contained in the holder 80. It will be appreciated that the fluid velocity is thus slowed by expanding the cross-sectional area of the chute 84 as appropriate. The shape of the chute 84 may be designed to slow the fluid down within a certain length while maintaining relatively laminar, or non-turbulent, flow into and through the holder 80 or "kill tunnel"; the expansion chute 84 may also flatten out the flow or have a profile that goes from circular to rectangular, for example, thus then transitioning to the substantially rectangular profile of the kill tunnel 80 itself, more about which is said below in connection with FIGS. 4 and 5. The expansion chute 84 can be made of any appropriate material now known or later developed, including but not limited to a flexible material or structure in order to provide compliance between the submerged components and those on the surface. As shown in FIG. 1, interconnecting cords or tethers 120 may also connect the holder 80 or "kill tunnel" to the concentrator 30 below, which in the exemplary embodiment is further maintained in a particular location employing one or more anchors or ballasts 130, so as to thereby maintain the overall positioning and spatial relationships of and between the various components.

Figure 4:
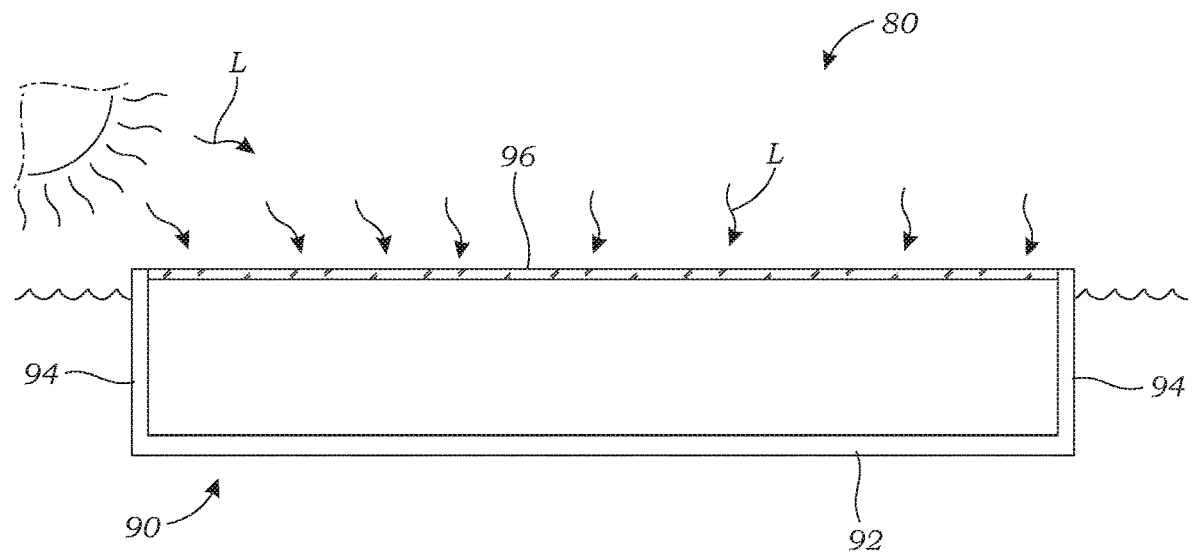
FIG. 4 is a side schematic rendering of an exemplary holder thereof, in accordance with at least one embodiment.
Figure 5:
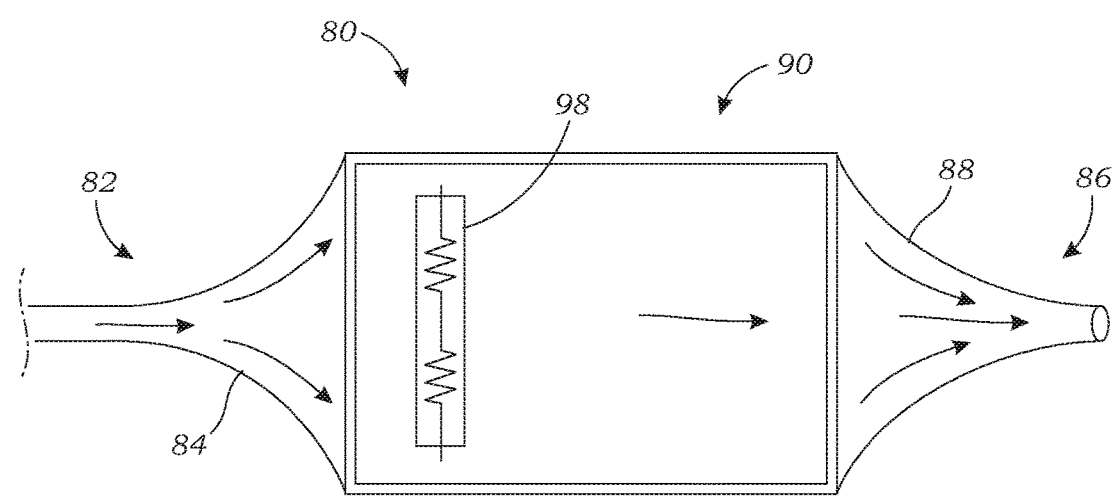
FIG. 5 is a reduced scale top schematic rendering of the exemplary holder of FIG. 4, in accordance with at least one embodiment.

Turning now to FIGS. 4 and 5, there are shown side and top schematic renderings of an exemplary holder 80 or "kill tunnel" employed as part of an organism eradication system 20 according to aspects of the present invention. Generally, the kill tunnel 80 in the exemplary embodiment is again located at or near the surface S of the body of water so as to expose the veligers in the captured sample to increased heat and UV levels to make the treatment even more lethal. In a bit more detail, the geometric shape of the kill tunnel 80 may be optimized to enhance the lethality in order to maximize system effectiveness and/or minimize dwell time, as by being in the exemplary embodiment much longer and wider than it is deep, to support such optimization. Those skilled in the art will appreciate that there is a correlation between temperature and veliger mortality, with greater temperature generally increasing the mortality rate; though too much reliance on temperature may decrease species selectivity in mortality. The addition of a molluscicide increases this rate even further, though such molluscicides or other agents may also be selected and tailored so as to target particular invasive or nuisance species while potentially not adversely affecting native or desirable species in the environment. Optimal temperature and molluscicide concentrations may be empirically determined to minimize collateral mortality in non-Dreissenidae mussels and other non-target organisms. Appropriate or optimal dwell time will also be empirically determined, but in one exemplary embodiment may be in the range of one to ten (1-10) hours. The holder 80 or "kill tunnel" may be surrounded by an air chamber that provides both buoyancy and thermal insulation from the water it is floating on top of or partially submerged in. The material of the main body 90 of the kill tunnel 80, particularly the bottom wall 92 and perhaps also the side walls 94, will be light absorbent, such as black, to enhance the greenhouse effect on the veligers, while the top wall 96 or upwardly-facing surface of the kill tunnel 80 may be clear or translucent, in whole or in part, to allow for sunlight L penetration, or the top of the kill tunnel 80 may even just be open, though it will be appreciated that an enclosed tunnel will have more of a greenhouse effect. In addition to any such greenhouse heating effect, UV light will penetrate into the relatively shallow kill tunnel 80 and also contribute to increased mortality of the veligers. To accommodate a wider range of sunlight and nighttime conditions, an optional electrical heating element 98 can be used to supplement or replace heating from sunlight. Those skilled in the art will appreciate that any molluscicide or other agent introduced in the mixing section 50 can be injected at relatively lower concentration due to the enhanced lethality of the greenhouse effect of the kill tunnel 80. In order to better stabilize the fluid dynamics within the kill tunnel 80, its body 90 can be of rigid or semi-rigid construction essentially to assist in maintaining its overall shape and anchoring or tying it to the sub-surface components. By way of further illustration and not limitation, the kill tunnel 80 may be on the order of two to twenty meters (2-20 m) long, a half meter to five meters (0.5-5 m) wide, and two tenths meter (0.2 m) deep, though could be on the order of one hundred meters (100 m) long or more, as this can increase the stability of the system 20 during rougher wave action on the surface S and of course allow for even longer dwell times. A nominal fluid flow rate or fluid velocity through the kill tunnel 80 could be on the order of one to two millimeters per second (1-2 mm/s), though again as stated above can be outside of this range or even the above-noted range depending on various factors. The result is essentially a relatively isolated and controlled volume for continued exposure of the veligers or other target organisms to the molluscicide or other kill agent injected within the system 20 as well as other environmental aggravations. Also, a closed-loop control system could be utilized between the pump 110 and the tunnel flow rate to enhance the stability of the velocity through the kill tunnel 80 under various ambient conditions. Relatedly, it will be appreciated that the outlet chute 88 positioned at the kill tunnel outlet 86 for the flow exiting the kill tunnel 80 will not only increase the velocity of the sample as it flows out of the system 20 and rejoins the surrounding body of water but will further serve to isolate the kill tunnel 80 itself from the surrounding ambient conditions or minimize outside disturbance of the kill tunnel 80. Accordingly, it will also be appreciated that while the "kill tunnel" is also more generally described or labeled herein as a "holder" as having a relatively larger volume and longer dwell time for the sample as compared with other parts of the system 20, the holder 80 is not necessarily a fixed or static volume but in the exemplary embodiment may also have an inlet 82 and an outlet 86 and a flow however slow therebetween. By way of further illustration and not limitation, the kill tunnel 80 may have valves or other such flow controls at one or both of the inlet 82 and the outlet 86 for further regulation of the flow therethrough, such that the kill tunnel 80 may temporarily and selectively be "opened" or "closed" as desired in processing or passing a sample through the system 20, such that those skilled in the art will appreciate that any such vocabulary and related descriptions concerning the "kill tunnel" are to be understood as illustrative and non-limiting. Further, based again on the geometry and characteristics of the kill tunnel inlet 82, and the inlet chute 84 particularly, the fluid velocity is slowed as the flow enters the kill tunnel 80, with the shape of the chute 84 potentially establishing or maintaining relatively laminar, or non-turbulent, flow into and through the holder 80 or "kill tunnel," on which basis a somewhat "steady state" within the kill tunnel 80 may be achieved over whatever dwell time, which in some contexts may further benefit the lethality of the agent while reducing or eliminating eddying or "dead zones" within the kill tunnel 80, though again not necessarily so. Indeed, it will be appreciated that in some contexts it may be beneficial for there to be a degree of turbulence within the kill tunnel 80 to support continued agitation and mixing of the agent within the concentrated fluid sample that contains the target organisms O while reducing or eliminating "dead zones,"

even at relatively low flow velocity. Once more, all such arrangements and operational parameters are possible in an organism eradication system 20 according to aspects of the present invention without departing from its spirit and scope.

Figure 6:
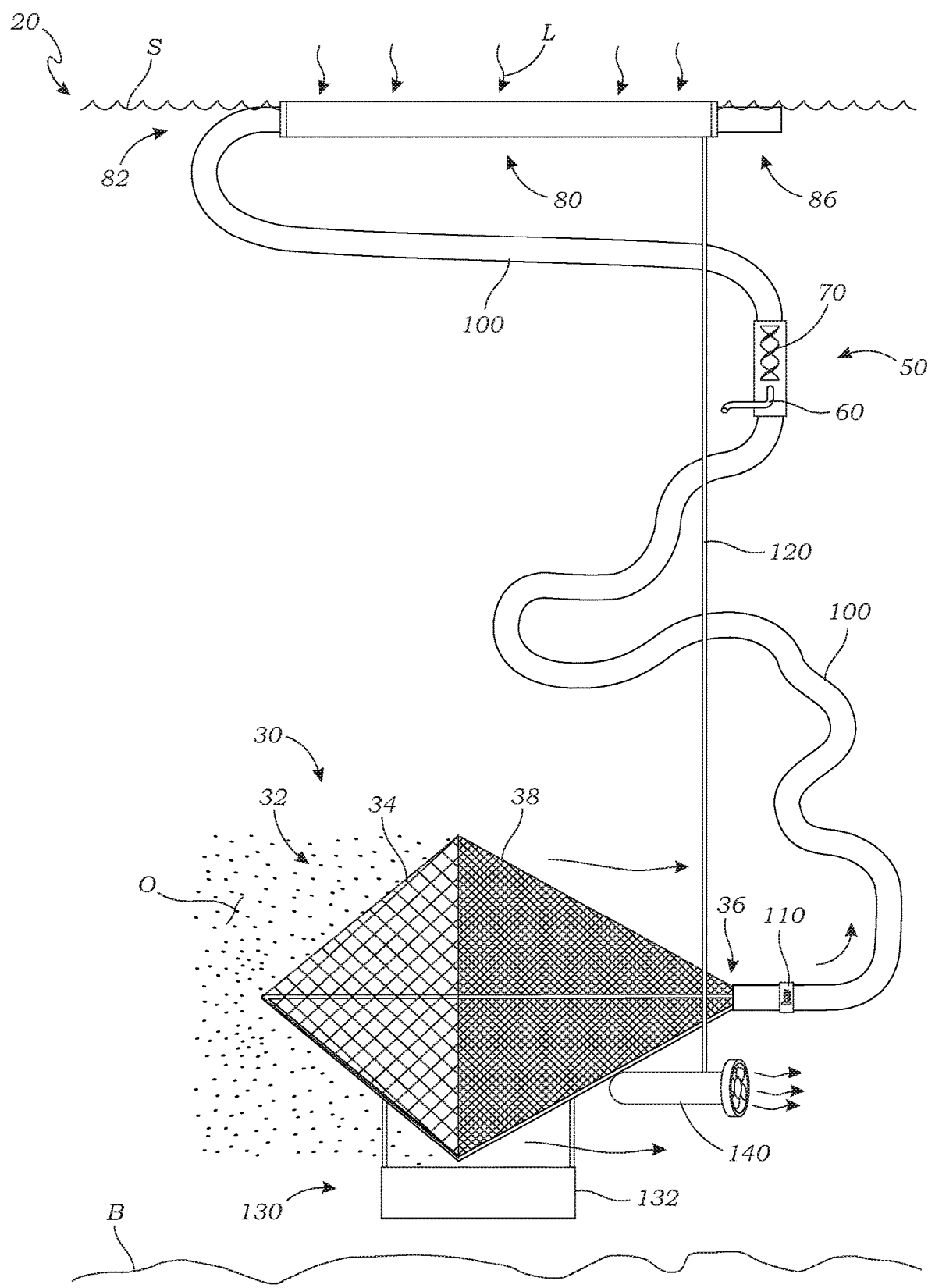
FIG. 6 is a schematic rendering of a second exemplary organism eradication system, in accordance with at least one embodiment.
Figure 7:
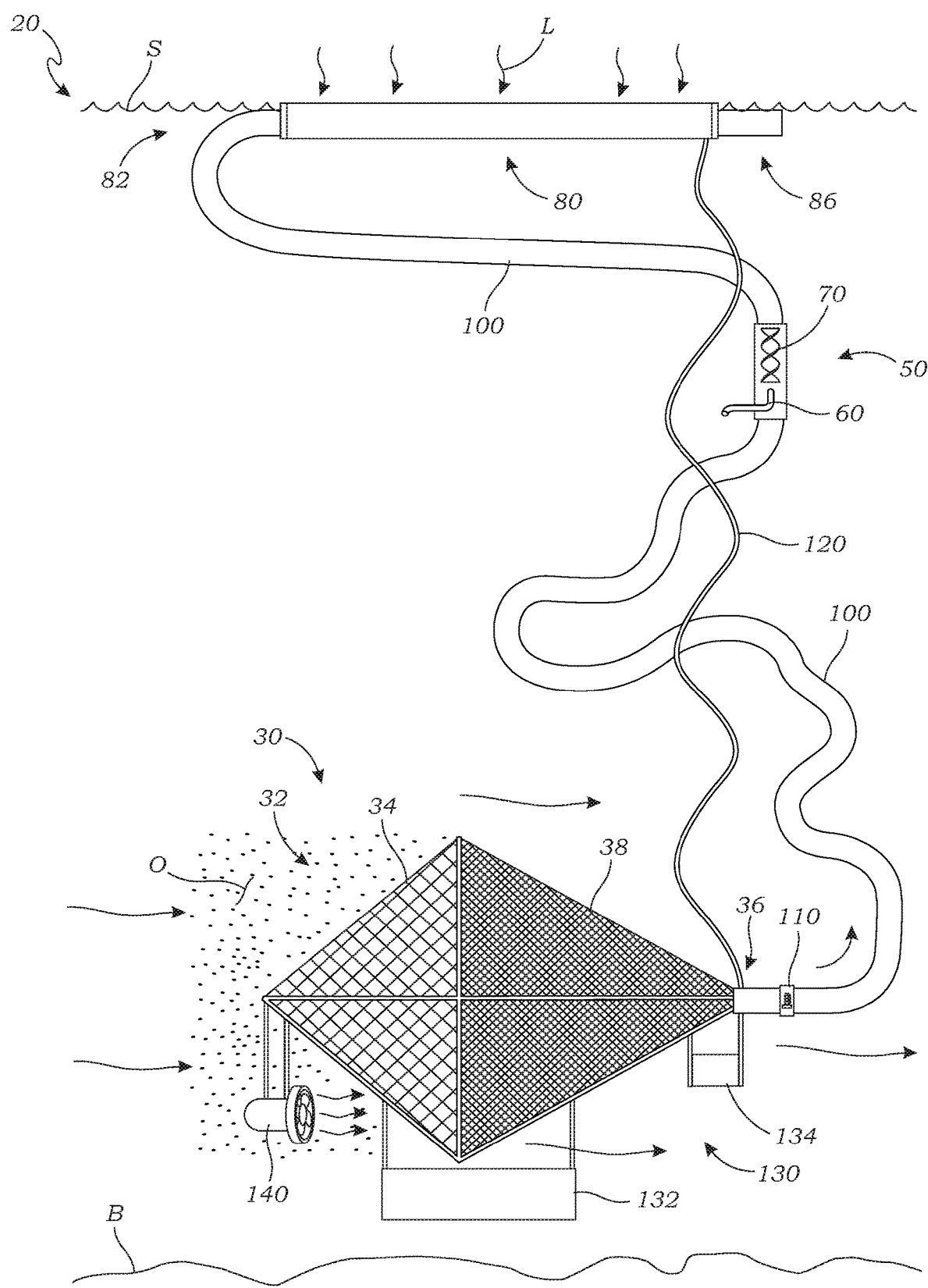
FIG. 7 is a schematic rendering of a third exemplary organism eradication system, in accordance with at least one embodiment.

Referring next and briefly to FIGS. 6 and 7, there are shown schematic renderings of alternative organism eradication systems 20 according to aspects of the present invention particularly as relating to optional means of locating or maintaining the location of the concentrator 30, generally or relative to the holder 80 or "kill tunnel" above in these examples. First, with reference to FIG. 6, the concentrator 30 can be provided having a ballast 130 in the form of an adjustable ballast tank 132 useful in adjusting the depth of the concentrator 30 and a propulsion device 140 for changing or maintaining the location of the concentrator 30, as may be further assisted once more by one or more umbilical or other such connecting cable or tether 120. As illustrated, the tether 120 may be relative larger or shielded and run between the holder 80 at the surface S so as to also supply power and control connection to the propulsion device 140 from above, though it will be appreciated that such may be self-contained at or within the propulsion device 140. Similarly, as shown in FIG. 7, at least one propulsion device 140 may be provided at the nose or the inlet 32 end of the concentrator 30 and a trim tank 134 at or near its tail or the exit or outlet 36 end of the concentrator 30, with again an adjustable buoyancy device 132 operably positioned on the concentrator 30 as well, here the adjustable ballast tank 132 and the trim tank 134 together defining the ballast 130 of the concentrator 30, somewhat analogous to the pair of ballasts 130 depicted in FIG. 1. Those skilled in the art will appreciate that any such propulsion, ballast/buoyancy, or other such devices useful for positioning the concentrator 30, whether now known or later developed, may be employed according to aspects of the present invention without departing from its spirit and scope.

Figure 8:
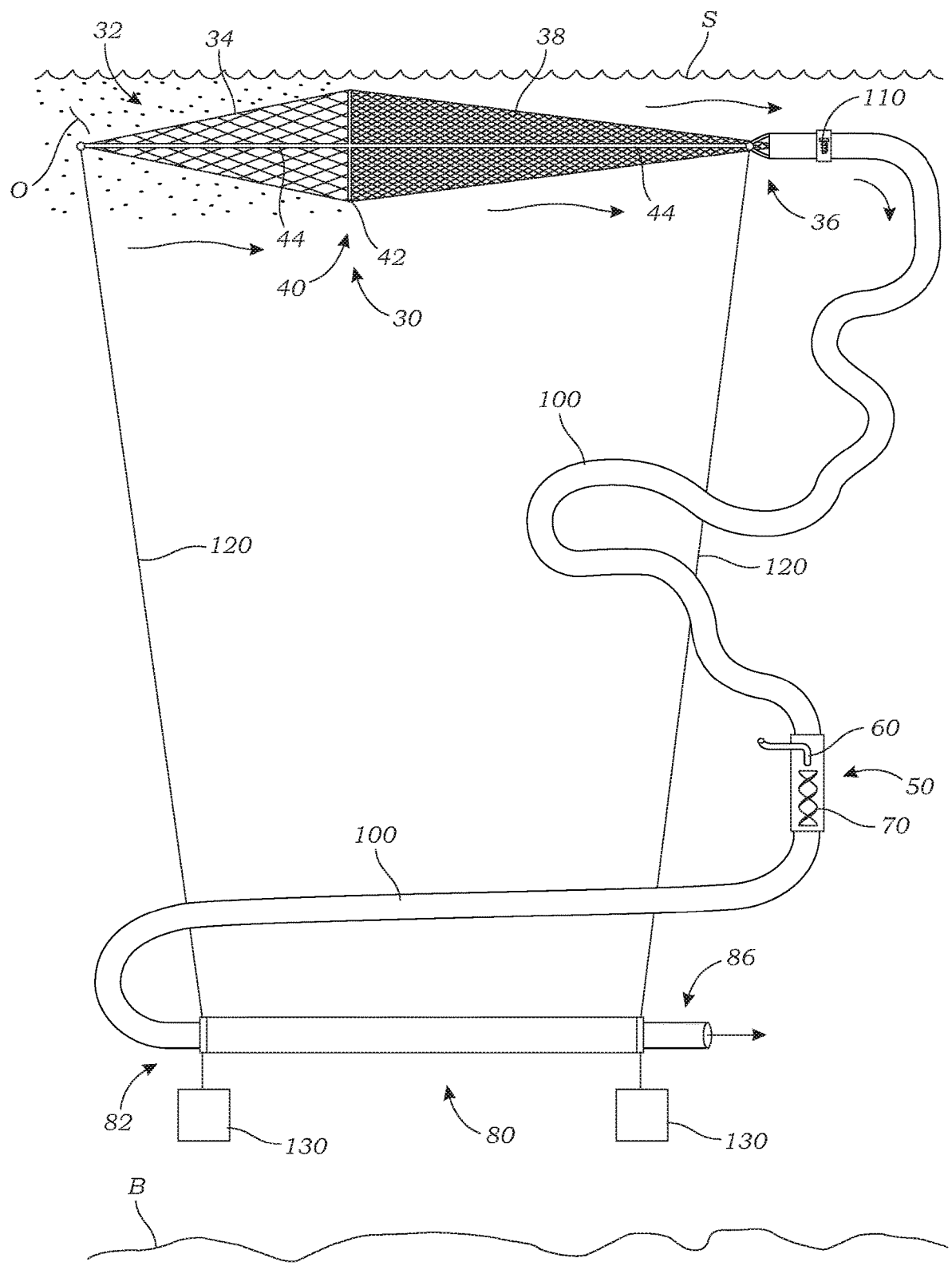
FIG. 8 is a schematic rendering of a fourth exemplary organism eradication system, in accordance with at least one embodiment.

Turning to FIG. 8, there is shown a further schematic rendering of yet another alternative exemplary organism eradication system 20 according to aspects of the present invention, here with the system 20 somewhat flipped with the holder 80 now submerged and the concentrator 30 at or near the surface. Those skilled in the art will appreciate that while in the exemplary embodiments of FIGS. 1-7 in the context of mussel veligers such target organisms O are known to prefer the cooler, darker water below the surface S, hence the location of the intake concentrator 30 at a selected depth, in the alternative exemplary context of phytoplankton as the target organisms O, known to exist in swarms or colonies or "blooms" typically at or near the surface S, the system 20 is thus configured again with the concentrator 30 at or near the surface S for the purpose of pulling in such phytoplankton organisms O. Naturally, then, the geometry of the concentrator 30, whether dictated by its framework 40 or otherwise, would be relatively wider and flatter as illustrated, such that the ring 42 may instead of being annular may take another shape such as oval or even rectangular. As also illustrated though not required or limiting, the rear pass-through net 38 may be relatively longer as compared to the forward blocking net 34, and the rearward and forward spokes 44 interconnecting the inlet 32 and the outlet 36 at the intermediate ring 42 sized accordingly, though it will again be appreciated that such structure is merely illustrative and non-limiting. With continued reference to FIG. 8, the system 20 may again be provided with a transfer or connector tube 100 interconnecting the concentrator 30 at the surface S and the submerged holder 80 or "kill tunnel," with one or more pump 110 and mixing section 50 comprising in the exemplary embodiment an injector 60 and a mixer 70 operably installed at an intermediate location along the connector tube 100. Further, as illustrated, interconnecting cables or tethers 120 may be positioned or link between the concentrator 30 and the holder 80, with again one or more ballasts 130 provided to maintain the holder 80 or "kill tunnel" at the desired depth, with such ballasts 130 potentially being adjustable as herein described. As also described herein though not shown, initially in the context of the "kill tunnel" at the surface, buoyant air chambers or the like may be provided to maintain the position of any such components of he system 20 at or near the surface, which it will be appreciated may here be employed in connection with the alternative exemplary embodiment having the concentrator 30 substantially at the surface S. An optional propulsion device 140 (FIGS. 6 and 7) may also again be employed in the alternative system 20, whether on or at the concentrator 30, the holder 80 or both. Those skilled in the art will further appreciate that with the concentrator at the surface S and the holder 80 or "kill tunnel" submerged in this "flipped" exemplary embodiment of the system 20 in the context of phytoplankton or any other such target organisms O that survive or thrive at the surface S and based on a degree of exposure to sunlight, by harvesting such organisms O at the surface S and taking them to a depth below the surface S where it is darker and the water cooler, that alone can be lethal to such organisms O let alone if an agent targeting such organisms O is introduced through the injector 60 within the mixing section 50, which agent it will again be appreciated is rendered more effective or lethal in combination with such environmental stressors as contemplated herein (e.g., sunlight and heat exposure for veligers and darkness and cool exposure for phytoplankton). It will be appreciated that a variety of such configurations or arrangements of the system 20 according to aspects of the present invention are possible without departing from its spirit and scope.

Finally, with reference to FIGS. 9 and 10, there are shown further schematic renderings of yet another alternative exemplary organism eradication system 20 according to aspects of the present invention wherein here both the concentrator 30 and the holder 80 or "kill tunnel" are located at or near the water surface S. Such a system 20 may again be employed in an exemplary context such as phytoplankton as the target organisms O. Here, as best seen in the enlarged view of FIG. 10 showing primarily the holder 80, it may again be configured as a relatively large pass-through chamber having slower flows and thus longer dwell times for the sample moving through the system 20 here after exposure to the selected agent in the mixing section 50. As an aside, here it noted that the exemplary system 20 is substantially linear, including the connector tube 100 between the concentrator 30 and the holder 80 or "kill tunnel," and the pump 110 and agent additive device or injector 60 are shown as both being separate from the mixer 70, such that a discrete mixing section 50 within the connector tube 100 is not shown, further demonstrating the schematic nature of such renderings and that any and all such components can be located or co-located in a variety of ways throughout the system 20 without departing from its aspects, features, and functionality, and specifically, in connection with all exemplary embodiments, that the mixing section 50 may or may not be a discrete tubing or component within the system 20 or in or along the connector tube 100, and the injector 60 may or may not be found in such tubing or component, should such exist, versus just being upstream of the mixing section 50 and particularly any mixer 70 along the connector tube 100 or even within the concentrator 30 at its outlet 36 or otherwise. The material of the main body 90 of the kill tunnel 80, here basically including the bottom wall 92, the side walls 94, and the top wall 96, may be an opaque or even reflective material, in whole or in part, so as to not only not allow or to block sunlight L from entering the kill tunnel 80, or keeping it relatively dark within the kill tunnel 80 throughout the day, by optionally reflecting the light L away from the tunnel 80 rather than absorbing the light L, the temperatures inside the tunnel 80 will be kept relatively cooler as a further environmental stress to sun-loving organisms such as phytoplankton. Accordingly, it will be further appreciated, though again not shown, that should air chambers or other such buoyancy devices be incorporated into such an alternative system 20, they may be spaced apart from the holder 80 or "kill tunnel" so as to not provide any unwanted insulative effect thereto. The top wall 96 or upwardly-facing surface of the kill tunnel 80 again may or may not be reflective but at the very least will block or filter sunlight L to prevent light penetration as effectively a photosynthesis blocker. More particularly, and by way of further illustration and not limitation, the blocker or top wall 96 may for example block or filter out light L in the wavelength ranges of roughly four hundred to five hundred nanometers (400-500 nm) and roughly six hundred thirty to six hundred eighty nanometers (630-680 nm), or potentially blocking blue/violet and orange/red light while allowing green light of approximately five hundred to six hundred nanometers (500-600 nm) to pass through, it being known that green light generally has no positive effect on photosynthesis, as most plants simply do not absorb but instead reflect black green light, making them appear all the more green in color, and in some cases green light can even negatively affect or restrict the efficiency of photosynthesis. Ultimately, again, rather than blocking or filtering out certain wavelengths of light, another possibility for the kill tunnel body 90, and its top wall 96 specifically, is for it to be reflective or non-transmissive of or basically block all visible light.

More generally, it is noted in connection with all exemplary embodiments of an organism eradication system 20 as shown and described herein that while the dead or dying organisms O may be simply pumped back out of the system 20 and into the water, in some cases such will instead be filtered and pumped out of the system 20 and the surrounding water rather than being reintroduced. Staying with the phytoplankton example, it will be appreciated by those skilled in the art that in some instances even dead phytoplankton can be harmful to the environment if in sufficient concentrations, as by the related bacterial decomposition that is triggered stripping the water of oxygen. As such, those skilled in the art will appreciate that a system 20 according to aspects of the present invention can be employed in a variety of contexts and ways beyond those disclosed without departing from its spirit and scope.

Aspects of the present specification may also be described as follows:

1. An organism eradication system for in situ capture and treatment of target organisms within a body of water, the system comprising: a concentrator having a concentrator inlet formed by a blocking net having a first mesh size and having a downstream concentrator outlet fed by a pass-through net interconnected with the blocking net, the pass-through net having a second mesh size, wherein the first mesh size is larger than the second mesh size; a holder having a body formed with at least one wall configured to selectively allow passage of sunlight, the holder defining a transient volume within which a fluid sample containing target organisms as obtained by the concentrator may temporarily dwell; a connector tube in fluid communication between the concentrator and the holder; and a mixing section along and in fluid communication with the connector tube, the mixing section comprising an injector for selectively injecting an agent into the fluid sample and a mixer downstream of the injector for selectively mixing the agent within the fluid sample, the agent selected as being lethal to the target organisms; whereby placement of the concentrator within the body of water and capture therein of target organisms within a size range between the first mesh size and the second mesh size so as pass such captured target organisms to the holder via the connector tube and the mixing section results in exposure of the target organisms to the agent and dwell of the target organisms with the agent under localized environmental stress within the holder for improved lethality of the agent.

2. The system of embodiment 1 wherein the concentrator further comprises a framework for selectively supporting the blocking net and the pass-through net.

3. The system of embodiment 2 wherein the framework comprises a transverse ring for supporting in an open configuration a distal end of the blocking net and a proximal end of the pass-through net.

4. The system of embodiment 3 wherein the framework further comprises a plurality of lengthwise spokes supporting the blocking net and the pass-through net relative to the ring and the concentrator outlet.

5. The system of any of embodiments 1-4 wherein the holder further comprises a holder inlet connected to and in fluid communication with the connector tube.

6. The system of embodiment 5 wherein the holder inlet comprises an expansion chute for slowing and widening the flow of the fluid sample entering the holder.

7. The system of any of embodiments 1-6 wherein the holder further comprises a holder outlet for discharging the fluid sample from the holder.

8. The system of embodiment 7 wherein the holder outlet comprises an outlet chute for accelerating and narrowing the flow of the fluid sample leaving the holder.

9. The system of any of embodiments 1-8 wherein the body of the holder defines a bottom wall, a plurality of interconnected side walls, and an interconnected top wall.

10. The system of embodiment 9 wherein the top wall is configured to selectively allow passage of sunlight.

11. The system of embodiment 9 or embodiment 10 wherein the top wall is translucent.

12. The system of embodiment 9 or embodiment 10 wherein the top wall is reflective.

13. The system of any of embodiments 9-12 wherein the top wall filters out sunlight in the wavelength ranges of roughly four hundred to five hundred nanometers (400-500 nm) and roughly six hundred thirty to six hundred eighty nanometers (630-680 nm).

14. The system of any of embodiments 9-13 wherein the bottom and side walls are opaque.

15. The system of any of embodiments 9-14 wherein the body defines a substantially rectangular profile.

16. The system of any of embodiments 1-15 wherein the holder further comprises a heating element.

17. The system of any of embodiments 1-16 further comprising at least one pump operably installed in fluid communication with the connector tube for moving the fluid sample through the system.

18. The system of any of embodiments 1-17 further comprising at least one tether interconnecting the concentrator and the holder so as to provide for stability and positionability between the concentrator and the holder.

19. The system of any of embodiments 1-18 further comprising at least one ballast operably engaged with one or more of the concentrator and the holder for further stability and positionability thereof.

20. The system of embodiment 19 wherein the at least one ballast comprises an adjustable ballast tank.

21. The system of embodiment 19 or embodiment 20 wherein the at least one ballast comprises a trim tank.

22. The system of any of embodiments 1-21 further comprising at least one propulsion device operably engaged with one or more of the concentrator and the holder for further stability and positionability thereof.

23. The system of any of embodiments 1-22 wherein the first mesh size is less than or equal to approximately four hundred micron (400 μm).

24. The system of any of embodiments 1-23 wherein the second mesh size is greater than or equal to approximately sixty-four micron (64 μm).

25. The system of any of embodiments 1-24 wherein the target organisms are mussel veligers and the concentrator is submerged within the body of water and the holder is at the surface of the body of water.

26. The system of any of embodiments 1-24 wherein the target organisms are phytoplankton and the concentrator is at the surface of the body of water and the holder is submerged within the body of water.

27. The system of any of embodiments 1-24 wherein the target organisms are phytoplankton and the concentrator and the holder are both at the surface of the body of water.

28. The system of any of embodiments 1-22 wherein the first mesh size is greater than or equal to approximately fifteen millimeters (15 mm).

29. The system of any of embodiment 28 wherein the second mesh size is greater than or equal to approximately a half millimeter (0.5 mm).

30. The system of embodiment 28 or embodiment 29 wherein the target organisms are spiny water fleas and the concentrator is submerged within the body of water and the holder is at the surface of the body of water.

31. A method of employing an organism eradication system as defined in any one of embodiments 1-30, the method comprising the steps of: positioning the concentrator at a first depth within the body of water associated with the location of the target organisms; positioning the holder at a second depth within the body of water; operating the system so as to pull target organisms within a fluid sample from the body of water into the system through the concentrator and then pass the fluid sample through the connector tube to the holder; introducing an agent into the fluid sample between the concentrator and the holder, the agent selected as being lethal to the target organisms; and maintaining the fluid sample containing the target organisms and the agent for a period of time within the holder so as to cause localized environmental stress on the organisms within the holder for improved lethality of the agent.

32. The method of embodiment 31 wherein one or more of the steps of positioning the concentrator and positioning the holder are accomplished employing one or more tethers interconnecting the concentrator and the holder.

33. The method of embodiment 31 or embodiment 32 wherein one or more of the steps of positioning the concentrator and positioning the holder are accomplished employing one or more ballasts.

34. The method of any of embodiments 31-33 wherein one or more of the steps of positioning the concentrator and positioning the holder are accomplished employing one or more propulsion devices.

35. The method of any of embodiments 31-34 wherein the first depth is greater than the second depth.

36. The method of any of embodiments 31-34 wherein the first depth is less than the second depth.

37. The method of any of embodiments 31-34 wherein the first depth and the second depth are substantially equivalent.

38. The method of any of embodiments 31-37 wherein the step of operating the system comprises controlling a pump that in turn controls the flow of the fluid sample through the system.

39. The method of any of embodiments 31-38 wherein the fluid velocity within the connecting tube is in the range of approximately a tenth meter per second to one meter per second (0.1-1.0 m/s).

40. The method of any of embodiments 31-39 wherein the step of introducing an agent comprises controlling an injector that in turn injects the agent into the fluid sample.

41. The method of embodiment 40 wherein the step of introducing an agent further comprises mixing the agent into the fluid sample downstream of the injector.

42. The method of any of embodiments 31-41 wherein the step of maintaining the fluid sample is for a period of time caused by a reduced fluid velocity within the holder.

43. The method of embodiment 42 wherein the fluid velocity within the holder is in the range of approximately a half millimeter per second to ten millimeters per second (0.5-10 mm/s).

44. The method of any of embodiments 31-43 wherein the step of maintaining the fluid sample further comprises exposing the fluid sample to sunlight.

45. The method of any of embodiments 31-43 wherein the step of maintaining the fluid sample further comprises blocking the fluid sample from sunlight.

46. The method of any of embodiments 31-45 wherein the step of maintaining the fluid sample further comprises heating the fluid sample.

47. A kit comprising an organism eradication system as defined in any one of embodiments 1-30.

48. The kit of embodiment 47, further comprising instructional material.

49. The kit of embodiment 48, wherein the instructional material provides instructions on how to perform the method as defined in any one of embodiments 31-46.

50. Use of an organism eradication system as defined in any one of embodiments 1-30 to selectively treat target organisms.

51. The use of embodiment 50, wherein the use comprises a method as defined in any one of embodiments 31-46.

In closing, regarding the exemplary embodiments of the present invention as shown and described herein, it will be appreciated that an organism eradication system and method of use is disclosed and configured for capturing and treating target organisms in a body of water. Because the principles of the invention may be practiced in a number of configurations beyond those shown and described, it is to be understood that the invention is not in any way limited by the exemplary embodiments, but is generally able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of ingredients, properties such as concentration, reaction conditions, and so forth, used to describe and claim certain embodiments of the inventive subject matter are to be understood as being modified in some instances by the terms "about" or "approximately" or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with any appended claims here or in any patent application claiming the benefit hereof, and it is made clear that the inventor(s) believe that the claimed subject matter is the invention.

What is claimed is:

1. An organism eradication system for in situ capture and treatment of target organisms within a body of water, the system comprising:
   a concentrator having a concentrator inlet formed by a blocking net having a first mesh size and having a downstream concentrator outlet fed by a pass-through net interconnected with the blocking net, the pass-through net having a second mesh size, wherein the first mesh size is larger than the second mesh size;

a holder having a body formed with at least one wall configured to selectively allow passage of sunlight, the holder defining a transient volume within which a fluid sample containing the target organisms as obtained by the concentrator may temporarily dwell;

at least one tether interconnecting the concentrator and the holder and at least one ballast operably engaged with the concentrator and the holder via the at least one tether so as to provide for stability and positionability between the concentrator and the holder, the blocking net forming the concentrator inlet engaged with the at least one tether for further stability and positionability thereof;

a connector tube in fluid communication between the concentrator and the holder; and a mixing section along and in fluid communication with the connector tube, the mixing section comprising an injector for selectively injecting an agent into the fluid sample and a mixer downstream of the injector for selectively mixing the agent within the fluid sample, the agent selected as being lethal to the target organisms;

whereby placement and positioning of the concentrator within the body of water via the at least one tether and the at least one ballast and capture therein of the target organisms within a size range between the first mesh size and the second mesh size so as to pass the captured target organisms to the holder via the connector tube and the mixing section results in exposure of the target organisms to the agent and dwell of the target organisms with the agent under localized environmental stress within the holder for improved lethality of the agent.

2. The system of claim 1 wherein the concentrator further comprises a framework for selectively supporting the blocking net and the pass-through net.

3. The system of claim 1 wherein the holder further comprises a holder inlet connected to and in fluid communication with the connector tube, the holder inlet comprising an expansion chute for slowing and widening the flow of the fluid sample entering the holder.

4. The system of claim 1 wherein the at least one wall comprises a bottom wall, a plurality of interconnected side walls, and an interconnected top wall.

5. The system of claim 4 wherein the top wall is configured to selectively allow passage of sunlight.

6. The system of claim 5 wherein the top wall is translucent.

7. The system of claim 1 wherein the holder further comprises a heating element.

8. The system of claim 1 further comprising at least one propulsion device operably engaged with one or more of the concentrator and the holder for further stability and positionability thereof.

9. The system of claim 1 wherein the first mesh size is less than or equal to approximately four hundred micron.

10. The system of claim 9 wherein the second mesh size is greater than or equal to approximately sixty-four micron.

11. The system of claim 9 wherein the target organisms are mussel veligers and the concentrator is submerged within the body of water and the holder is at the surface of the body of water.

12. The system of claim 9 wherein the target organisms are phytoplankton and the concentrator is at the surface of the body of water and the holder is submerged within the body of water.

13. The system of claim 1 wherein the first mesh size is greater than or equal to approximately fifteen millimeters.

14. The system of claim 13 wherein the second mesh size is greater than or equal to approximately a half millimeter.

15. The system of claim 13 wherein the target organisms are spiny water fleas and the concentrator is submerged within the body of water and the holder is at the surface of the body of water.

16. An organism eradication system for in situ capture and treatment of target organisms within a body of water, the system comprising:

a concentrator having a concentrator inlet formed by a blocking net having a first mesh size and having a downstream concentrator outlet fed by a pass-through net interconnected with the blocking net, the pass-through net having a second mesh size, wherein the first mesh size is larger than the second mesh size;

a holder having a body formed to selectively allow passage of sunlight, the holder defining a transient volume within which a fluid sample containing the target organisms as obtained by the concentrator may temporarily dwell, the holder comprising a holder inlet defining an expansion chute having an expanding cross-sectional area for slowing and widening the flow of the fluid sample entering the holder;

at least one tether interconnecting the concentrator and the holder and at least one ballast operably engaged with the concentrator and the holder via the at least one tether so as to provide for stability and positionability between the concentrator and the holder, the blocking net forming the concentrator inlet engaged with the at least one tether for further stability and positionability thereof;

a connector tube in fluid communication between the concentrator outlet and the holder inlet;

a mixing section along and in fluid communication with the connector tube, the mixing section comprising an injector for selectively injecting an agent into the fluid sample, the agent selected as being lethal to the target organisms; and at least one pump operably installed in fluid communication with the connector tube for moving the fluid sample through the system, a closed-loop control system comprising the at least one pump serving to control flow rate of the fluid sample and to stabilize velocity through the holder in cooperation with the expansion chute;

whereby placement and positioning of the concentrator within the body of water via the at least one tether and the at least one ballast and capture therein of the target organisms within a size range between the first mesh size and the second mesh size so as to pass the captured target organisms to the holder via the connector tube and the mixing section results in exposure of the target organisms to the agent and dwell of the target organisms with the agent under localized environmental stress within the holder for improved lethality of the agent.

* * * * *